US010090713B2

United States Patent
Gaskill et al.

(10) Patent No.: US 10,090,713 B2
(45) Date of Patent: Oct. 2, 2018

(54) MULTIPLE COILS FOR WIRELESS POWER

(71) Applicants: Steven G. Gaskill, Corvallis, OR (US); Zhen Yao, San Jose, CA (US); Yujuan Zhao, Santa Clara, CA (US); Essam Elkhouly, Santa Clara, CA (US); Songnan Yang, San Jose, CA (US)

(72) Inventors: Steven G. Gaskill, Corvallis, OR (US); Zhen Yao, San Jose, CA (US); Yujuan Zhao, Santa Clara, CA (US); Essam Elkhouly, Santa Clara, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 15/282,476

(22) Filed: Sep. 30, 2016

(65) Prior Publication Data

US 2018/0097401 A1    Apr. 5, 2018

(51) Int. Cl.
| | |
|---|---|
| *H01F 27/42* | (2006.01) |
| *H01F 37/00* | (2006.01) |
| *H01F 38/00* | (2006.01) |
| *H02J 50/12* | (2016.01) |
| *H02J 7/02* | (2016.01) |
| *H02J 50/60* | (2016.01) |
| *H02J 50/90* | (2016.01) |

(52) U.S. Cl.
CPC .............. *H02J 50/12* (2016.02); *H02J 7/025* (2013.01); *H02J 50/60* (2016.02); *H02J 50/90* (2016.02)

(58) Field of Classification Search
CPC . H02J 5/005; H02J 7/025; H02J 17/00; H01F 38/14; B60L 11/182

USPC .......................................................... 307/104
See application file for complete search history.

(56) References Cited

U.S. PATENT DOCUMENTS

| | | | |
|---|---|---|---|
| 2013/0154383 A1 | 6/2013 | Kasturi et al. | |
| 2013/0187474 A1* | 7/2013 | De Boodt | H02J 5/005 307/104 |
| 2015/0022020 A1 | 1/2015 | Borngraber | |

(Continued)

FOREIGN PATENT DOCUMENTS

| | | |
|---|---|---|
| KR | 20160015055 A | 2/2016 |
| KR | 20160090420 A | 8/2016 |

OTHER PUBLICATIONS

PCT International Search Report, PCT Application No. PCT/US2017/048464, dated Dec. 19, 2017, 3 pages.

*Primary Examiner* — Quan Tra
(74) *Attorney, Agent, or Firm* — International IP Law Group, P.L.L.C.

(57) ABSTRACT

A wireless power transfer device and method including a first coil of wire having a first winding to receive electrical current and emit a first electromagnetic field, a second coil of wire having a second winding to receive electrical current and emit a second electromagnetic field, the second electromagnetic field weaker than the first electromagnetic field. A combined electromagnetic field of the first electromagnetic field and the second electromagnetic field to transmit power wirelessly through a first external surface of the wireless power transfer device to a receiving device, and decay faster over distance through a second external surface of the wireless power transfer device than through the first external surface.

25 Claims, 9 Drawing Sheets

(56) References Cited

U.S. PATENT DOCUMENTS

2015/0197155 A1    7/2015   Lu et al.
2016/0284465 A1*   9/2016   Maniktala ............... H01F 38/14

* cited by examiner

100

200

300

400

600

620

700

800

MULTIPLE COILS FOR WIRELESS POWER

TECHNICAL FIELD

The present techniques relate generally to wireless power transfer and, more particularly, to shielded wireless power transfer.

BACKGROUND

Wireless charging is becoming increasingly popular with mobile devices such as smartphones and tablets. In some examples, wireless power can make recharging a mobile device as seamless as putting down the mobile device on a wireless charging mat or onto a table having an embedded wireless charger, and the like. In operation, wireless charging may employ electromagnetic induction using an electromagnetic field to transfer power from the charger to the smartphone or tablet, or to another type of receiving device. The induction may involve feeding power to a base unit or charging station having an induction coil. This powered induction coil creates an electromagnetic field. When a second induction coil, such as of a receiving device, becomes near, the power will transfer to the receiving device and be converted back into an electrical current in the receiving device. The wirelessly supplied power can activate the receiving device such as in the case of low-power radio-frequency identification (RFID) chips, charge a battery of the receiving device, and so on. Induction chargers generally operate over a short distance and while physical contact between a receiving device and the wireless charger is typically not necessary for induction to function, such contact may be beneficial to advance the wireless power transfer.

In general, this wireless charging employing inductive charging or resonance inductive charging uses an electromagnetic field to transfer energy between two objects through electromagnetic induction. The supply object may be a charging station. Again, energy is sent through an inductive coupling to the receiving object such as an electronics device which can then use that energy to charge batteries or run the electronics device, and the like. As indicated, induction chargers use an induction coil to create an alternating electromagnetic field from within a charging base. A second induction coil in the portable device takes power from the electromagnetic field and converts the power back into electric current to charge a battery of the portable device or to run the portable device, and so forth. The two induction coils in proximity combine to form an electrical transformer. Greater distances between sender and receiver coils can generally be achieved when the inductive charging system uses resonant inductive coupling.

As indicated, wireless inductive charging is gaining popularity for use in consumer rechargeable applications such as cordless power tools, net books, notebooks, smartphones, tablets, and other rechargeable devices. With inductive charging systems, there is potential of charging multiple devices via a single wall outlet, the convenience of having a vehicle charger that is non-contact, and other examples. In general, power is induced through the primary charging coil and a magnetic field is produced which is then received by the secondary coil and converted back into a voltage. Shielding can be added to either coil of the transformer system to direct the field effects, which can be useful in multiple pad charging applications to reduce power cross-talk, for instance. Intelligent features can also be added to these systems, such as communication to determine varying charge levels and intelligent sensing of foreign objects on the charging pad to disable the charger output, and so forth. Lastly, an issue associated with wireless power systems may be limiting exposure of the electromagnetic fields to people.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
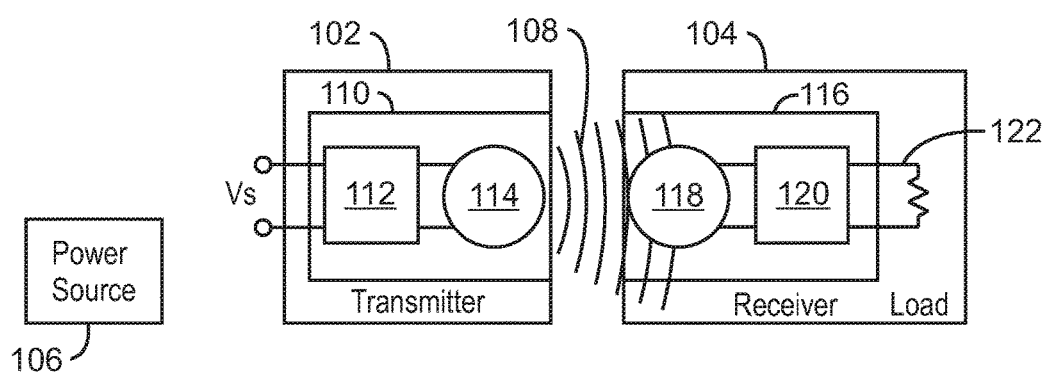
FIG. 1 is a diagram of a general wireless power system in accordance with embodiments of the present techniques.

The present techniques relate generally to a magnetic coil for charging wireless devices and more particularly, to having an additional magnetic coil for shielding. Devices for wireless charging may include multi-layer coils, one coil a charging coil and another coil a shielding coil, for beneficial field uniformity and reduced specific absorption rate (SAR) in human tissue.

In inductive coupling, such as with electromagnetic induction or inductive power transfer, power is transferred between coils of wire by a magnetic field. In other words, the transmitter and receiver coils together form a transformer. An alternating current (AC) may pass through the transmitter coil creating an oscillating magnetic field (B) by Ampere's law. The magnetic field passes through a receiving coil of a device that is to receive the power transfer, where the field induces an alternating electric magnetic field (EMF) voltage by Faraday's law of induction, which may create an AC current in the receiver.

Inductive coupling is used with wireless power technology, such as with charging stands for cordless appliances in wet environments such as electric toothbrushes and shavers. Inductive coupling may also be used to charge electric vehicles such as cars and to either charge or power transit vehicles like buses and trains. A fast growing use is wireless charging pads or charging tables/desks to recharge mobile and handheld wireless devices such as laptop and tablet computers, cellphones, digital media players, video game controllers, and the like.

Resonant inductive coupling is a form of inductive coupling in which power is transferred by magnetic fields between two resonant circuits (tuned circuits), one in the transmitter and one in the receiver. Each resonant circuit may consist of a coil of wire connected to a capacitor, or a self-resonant coil or another resonator with internal capacitance. The two are tuned to resonate at the same resonant frequency. The resonance between the coils can increase coupling and power transfer.

In general, "wireless power transfer" may be a collective term that refers to a number of different technologies, such as inductive coupling, resonant inductive coupling, capacitive coupling, magnetodynamic coupling, microwaves, and light waves, for transmitting energy via electromagnetic fields. A wireless power system may consist of a "transmitter" connected to a source of power such as a mains power line. The transmitter converts the power to an electromagnetic field. One or more "receiver" devices receive the power and convert the power to direct current (DC) or alternating current (AC) electric current, which may be used by an electrical load of the receiving device. At the transmitter, the input power may be converted to an oscillating electromagnetic field by some type of "antenna" device. The word "antenna" may refer to a coil of wire which generates a magnetic field, a metal plate which generates an electric field, an antenna which radiates radio waves, or a laser which generates light, and so forth. A similar antenna or coupling device at the receiver converts the oscillating fields to an electric current.

FIG. 1 is wireless power system 100 including a wireless power transfer device 102 that transfers or supplies power wirelessly to a wireless receiving device 104 such as a smartphone, tablet, notebook, vehicle, electric toothbrush, etc. The wireless power supply device 102 may couple to a power source 106 such as a mains line. The wireless power transfer device 102 may receive input power from the power source 106 and convert the input power to an electromagnetic field 108 via a transmitter 110. To generate the field 108, a conditioning device 112 such as an oscillator, invertor, and so on, may condition the input power prior to feed of the input power to an antenna 114. In the illustrated example, the transmitter 110 has a coupling device or antennae 114 that generates or forms the electromagnetic field 108.

The receiving wireless device 104 includes a receiver 116 having an antenna 118 to receive the electromagnetic field 108 and a converter 120 to convert the field 108 into a voltage or current type applicable to operation of the wireless receiving device 104 or to charging (a battery) of the receiving device 104, and the like. Indeed, the received power may be applied to such a load 122 of the receiving device 104. In inductive or resonant inductive power transfer, the antennae 114 of the transmitter 110 may be a coil of wire to generate the magnetic field 108, and the antennae 118 of the receiver 116 may be another coil of wire to receive the magnetic field 108 (e.g. for charging a battery of a receiving device 104).

Figure 2:
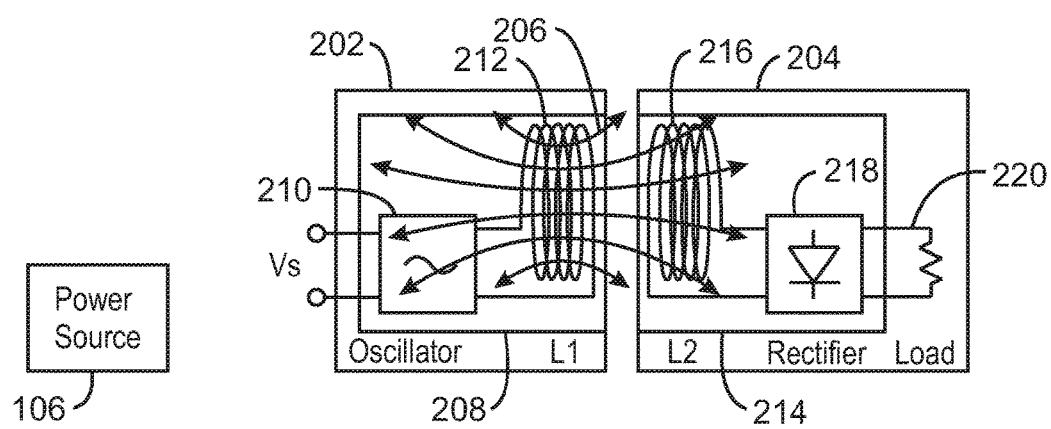
FIG. 2 is a diagram of a wireless power system employing induction or resonance induction in accordance with embodiments of the present techniques.

FIG. 2 is wireless power system 200 including a wireless power transfer device 202 (e.g., a wireless charger, charging table, charging pad, power transfer unit or PTU, etc.) that transfers power wirelessly to a wireless device 204 which is a wireless power receiving device such as smartphone, tablet, notebook, vehicle, electric toothbrush, portable media player, digital camera, wearable (e.g., smartwatch, smart glasses), and so on. The wireless power supply device 202 may couple to a power source 106. The wireless power supply device 202 may receive input power from the power source 106 and convert the input power to an electromagnetic field 206 via a transmitter 208. In this example, the transmitter 208 has an oscillator 210 and a wire coil 212 to generate or give the electromagnetic field 206. The receiving wireless device 204 includes a receiver 214 having a wire coil 216 to receive the electromagnetic field 206 and a rectifier 218 to condition the received power prior to application of the power to a load 220 of the device 204. In sortie examples, the rectifier 218 may be an electrical device that converts AC into DC by allowing a current to flow through the rectifier 218 in one direction only. This process may generally be known as rectification.

An electromagnetic coil is an electrical conductor such as a wire in the shape of a coil, spiral or helix. Electromagnetic coils are used in electrical engineering, in applications where electric currents interact with magnetic fields, in devices such as inductors, electromagnets, transformers, and sensor coils. An electric current may be passed through the wire of the coil to generate a magnetic field. The advantage coil shape generally increases the strength of magnetic field produced by a given current. The magnetic fields generated by the separate turns of wire pass through the center of the coil and add (superpose) to produce a field. Typically, for the same current, the more turns of wire, the stronger the field produced. A changing external magnetic flux induces a voltage in a conductor such as a wire, due to Faraday's law of induction. The induced voltage can be increased by winding the wire into a coil, because the field lines intersect the circuit multiple times.

Industry standards and government regulations may be applicable to wireless power transfer devices such wireless power transmitting units or wireless chargers including charging pads, charging tables, and so on. These standards include the Qi™ standards developed by the Wireless Power Consortium (WPC) and directed to inductive coupling including resonant, the Airfuel™ Alliance (AFA) standards, and other standards. The AFA directed to at least inductive and resonant charging is a merger of the Alliance for Wireless Power (A4WP) and the Power Matters Alliance (PMA). While embodiments herein may consider industry standards, government regulations, and so forth, the techniques are not limited to a standard or regulation.

Magnetic-charging fields of a power transmitting unit (PTU) (e.g., in or a wireless power transfer device or wireless charger) should generally be uniform from the charging surface (e.g., table surface, pad surface, power delivery surface, etc.) above the charging coil and provide consistent power transfer to power receiving units (PRUs) that may be a wireless device or in wireless device. Additionally, in certain applications, the magnetic field to the side or below the PTU may not provide much power transfer for a receiving device but unfortunately may induce power dissipation in human tissues of people nearby the PTU characterized, for example, by the specific absorption rate (SAR). Various governmental entities may address such absorption. For instance, in the United States, the Federal Communications Commission (FCC) has a regulation addressing a limit of SAR in the human body.

In a specific example of a table as the charger, a PTU may be installed in or under the table. The same electromagnetic field may be generated, via the PTU, above and below the table. The field above charges the wireless receiving device placed on the top surface of table. The field below may be absorbed by a user, such as absorbed by a user's thighs or legs situated beneath the table. This absorption should generally be compliant with FCC SAR limits. The problem is to provide both the uniform field above the PTU in the charging region and reduce the magnetic field below the PTU to reduce absorption in human tissue, meet regulatory limits, and so on. Embodiments herein provide solutions to address this problem.

Figure 3:
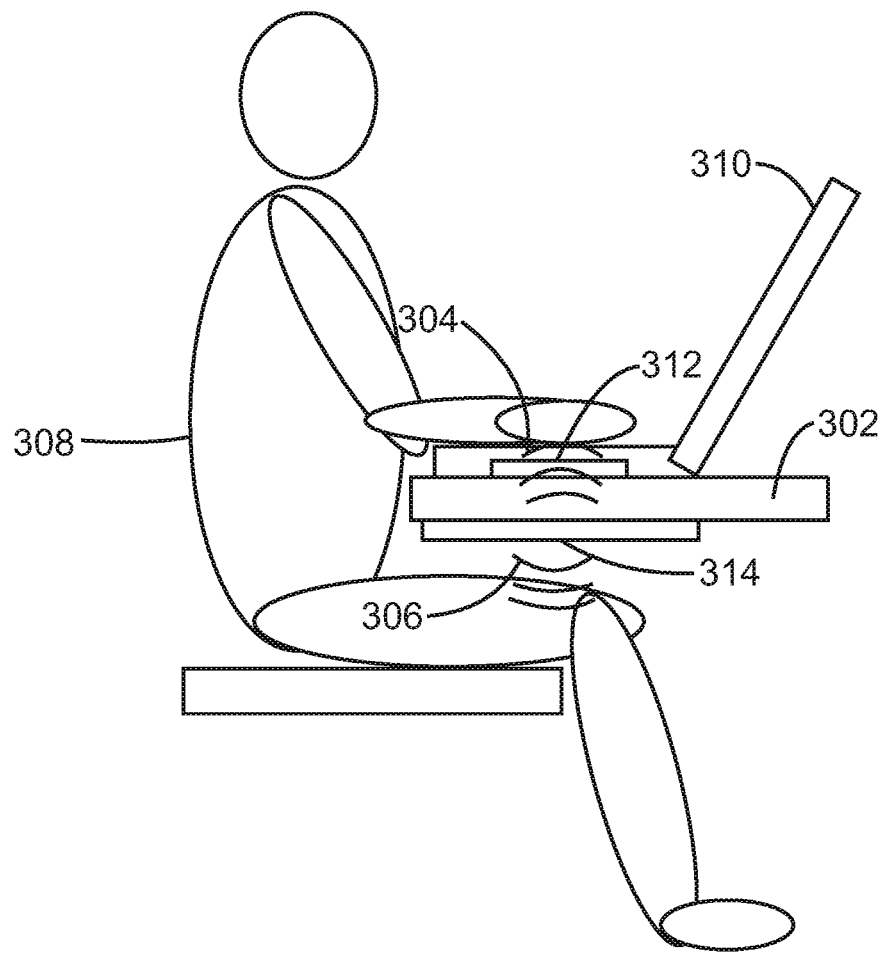
FIG. 3 is a diagrammatical representation of a wireless power transfer system employing induction or resonance induction.

FIG. 3 is a wireless power transfer system 300. In this example, the wireless power transfer device is a wireless power transfer table 302 (or desk, pad, surface, etc.) employing induction or resonance induction for power transfer to a receiving device(s). The table 302 emits an electromagnetic field above the table 302, as indicated by reference numeral 304, and below the table, as indicated by reference numeral 306. In this example, a lower portion of a human 308 body may be subjected to the electromagnetic field 306. As discussed below, the present techniques may limit this part 306 of the electromagnetic field so to reduce absorption of the electromagnetic field into the human body.

In this particular illustrated example, the receiving device is a mobile device 310 such as a laptop computer. The mobile device 310 includes a receiving unit 312 having a coil of wire and circuitry to receive the magnetic field 304. The table 302 includes a wireless power transmitter 314 (having a charging coil of wire and circuitry) that emits the electromagnetic field above 304 and below 306 the table 302. The table 302 emits the electromagnetic field above 304 the table 302 to transfer power to (e.g., for charge of a battery in) the mobile device 310 resting on the table 302. The transmitter 314 may be a PTU in or underneath the table, or the table 302 having the transmitter 314 may be characterized as a PTU.

Figure 4:
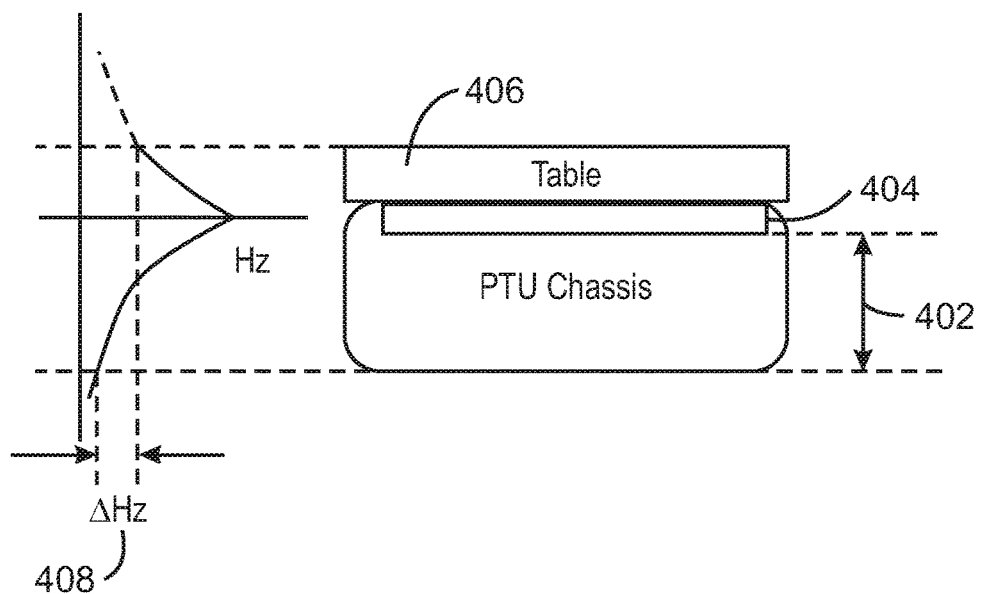
FIG. 4 is a diagram of a wireless power transfer device employing induction or resonance induction.

FIG. 4 is a wireless power transfer device 400 employing induction or resonance induction. In this example, the device 400 includes a wireless power transmitter (e.g., a power transfer unit or PTU) having circuitry, a PTU chassis with a thickness or depth 402, and a coil 404 of wire to emit an electromagnetic field. The device 400 also includes a table 406 having a top charging surface. A mobile device may be placed near or on the top surface of the table 406 to receive power from the wireless power transmitter of the device 400 via the electromagnetic field.

FIG. 4 depicts a conventional solution to meeting an SAR limit by having a thick or deep depth 402 of chassis to reduce exposure of the electromagnetic field to human tissue below the table 406. In the illustrated representation, the delta Hertz (ΔHz) 408 indicates less Hz at the bottom surface of the PTU chassis (near where human tissue such as human thighs may be) as compared to the top surface (e.g., charging surface) of the table 406. Again, this common solution is to build in extra separation between the PTU coil 404 and, for example, a user's lap by increasing thickness 402 of the PTU chassis. Thus, because the field generated by the PTU decays symmetrically in amplitude the same distance above and below the coil 404, farther separation on the bottom side may provide that the user is subjected to lower field than FCC SAR limit. However, this technique may also yield very thick PTU designs that are typically aesthetically unappealing, difficult to install, and may not readily fit within the device such as with the table 406 or seat, or other usage configurations.

Figure 5:
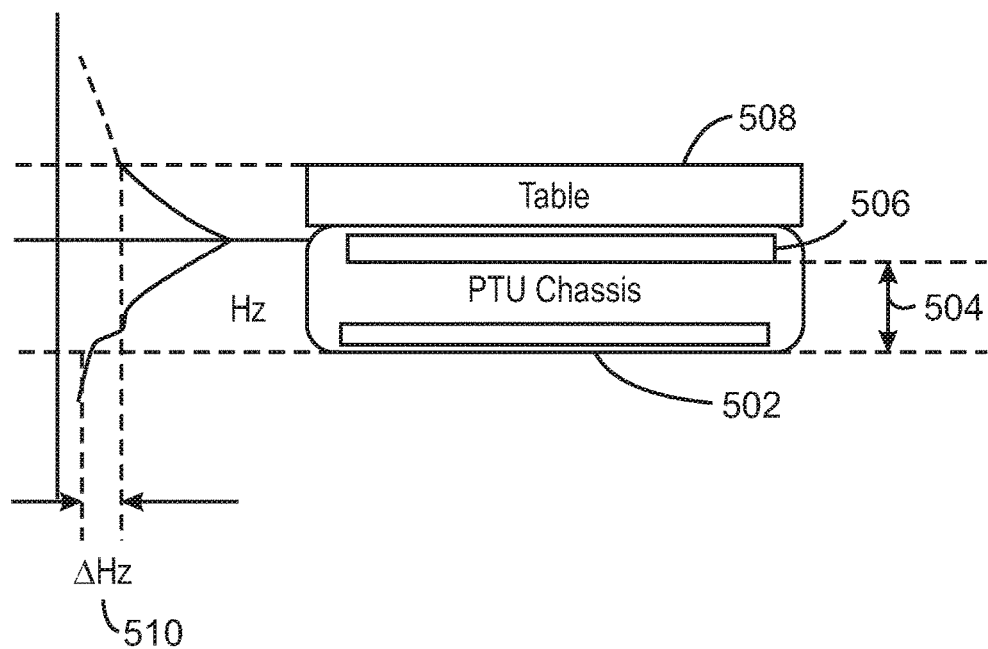
FIG. 5 is a diagram of a wireless power transfer device employing induction or resonance induction.

FIG. 5 is a wireless power transfer device 500 having a wireless power transmitter or PTU including circuitry and a PTU chassis, wherein the wireless power transmitter employs induction or resonance induction. The device 500 is similar to the device 400 of FIG. 4. However, the wireless power transmitter of the device 500 employs a ferrite shielding layer 502. Therefore, the thickness or depth 504 of the PTU chassis is less than the depth 402 of the PTU chassis of the device 400 in FIG. 4. In other words, the Hz of the electromagnetic field from the device 500 may be low at the bottom of the PTU chassis even though the PTU chassis is not thick or deep because the ferrite shielding layer 502 partially blocks or attenuates the electromagnetic field.

The wireless power transmitter of the device 500 includes a coil 506 of wire to emit an electromagnetic field. The device 500 includes a table 508 having a top surface as a charging service or power delivery surface. A mobile device may be placed near or on the top surface of the table 508 to receive power from the wireless power transmitter of the device 500 via the electromagnetic field.

In the illustrated representation, the ΔHz 510 as shown indicates less Hz at the bottom surface of the PTU chassis (near where human tissue such as human thighs may be) as compared to the Hz at the top surface (e.g., charging surface) of the table 508. Thus, this solution decreases the PTU thickness by employing a ferrite layer 502 to channel the magnetic flux/fields away from the user body below the table 508. The introduction of ferrite material may significantly reduce the electromagnetic field on the bottom surface of the PTU and facilitate a thin PTU design. However, the ferrite material is often expensive, rendering the solution not practical for high volume production in certain applications.

In cases of FIG. 4 or FIG. 5, a difference in electromagnetic field strength (ΔH) between the charging surface and the bottom surface of PTU assembly may be established for radio frequency (RF) exposure compliance. However, at a cost of ether usability or expense. In contrast, embodiments herein may be a relatively low-expense solution with two vertically separated coils (as opposed to a single charging coil). These two coils may be turns of wire having opposite winding senses so that the combined coils reduce the field below and provide uniform field above.

Two aspects may include: (1) a first coil to emit the electromagnetic field for power delivery and a second coil that is offset (e.g., in the z-direction) to provide an additional degree of freedom to allow the electronic fields above and below to be independent such as to have uniform field on top and faster decay on bottom; and (2) reverse-direction (opposite winding sense/opposite sign of current) turns of the second coil versus the primary coil to aid in simultaneously meeting two design criteria of uniform electromagnetic field on top and reduced electromagnetic field on bottom.

Figure 6:
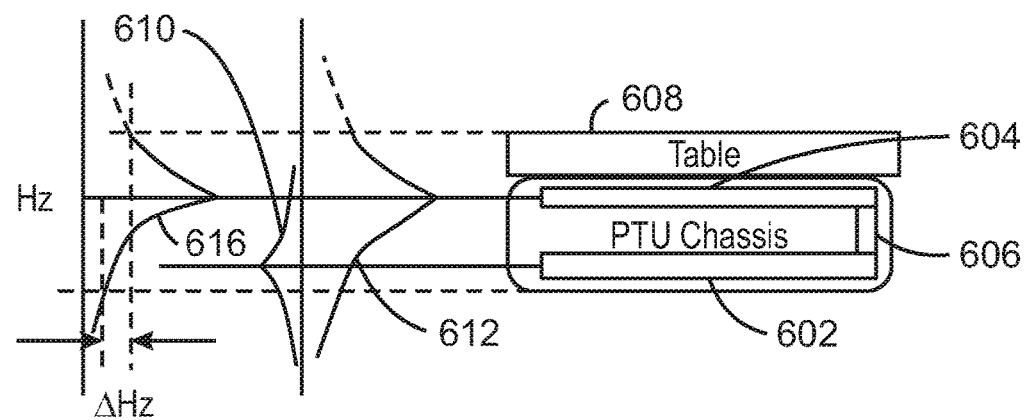
FIG. 6 is a diagram of a wireless power transfer device employing induction or resonance induction and having two coils in accordance with embodiments of the present techniques.

FIG. 6 is a wireless power transfer device 600 employing induction or resonance induction and having a shielding coil 602 in accordance with embodiments of the present techniques. The wireless power transfer device includes two coils 602 and 604. The first coil or top coil 604 may be a power delivery coil or charging coil that emits an electromagnetic field for delivering power wirelessly to a receiving mobile device. As mentioned, the second coil or bottom coil 602 is a shielding coil, and is discussed below. In the illustrated example, the two coils 602 and 604 are coupled via a connector 606 such as a wire, shunt, etc.

The device 600 may include the table 608 (or desk, etc.) and with a PTU having the two coils 602 and 604 disposed in or below the table 608. A charging surface or power delivery surface in this example is a top surface of the table 608. The power receiving device (not shown) may be mobile device (e.g., smartphone, tablet, notebook, etc.) placed near or on the top surface of the table 608. It should be noted that the device 600 may be the PTU and not include the table 608 but with the table 606 to receive the device 600. The top surface of the PTU may be a power delivery surface or power transfer surface.

In general, FIG. 6 indicates a mechanical construction and field distribution of the wireless power transfer device 600. In the illustrated representation, each one of the two coils 602 and 604 are generally planar, such as horizontally or in the x-y plane. One coil 604 is placed on top of the other coil 602 with a generally fixed vertical or z-direction separation. The electromagnetic field contribution of each coil 602 and 604 is depicted graphically to the left with field Hz 610 and field Hz 612 generated by each coil 602 and 604 layer, respectively, and which are symmetric around the elevation plane on which the coils 602 and 604 reside, respectively.

Further, with a selected current distribution and/or turn configuration, the bottom coil 602 can be configured to generate an electromagnetic field that is generally opposite in phase with the electromagnetic field generated by the top coil 604. As a result, the combined field having Hz 616 exhibits faster decay over distance on the bottom side compare to the top side, which provides a difference in electromagnetic field strength ΔH between the charging surface and bottom of PTU assembly to reduce exposure below the table 608 while maintaining the field above the PTU for power delivery to a power receiving device. Lastly, additional coils may be employed. Moreover, other shielding coils may be positioned to attenuate the electromagnetic field from the charging coil 604, such as to the side of the charging coil 604 in the x-direction or y-direction.

Figure 6A:
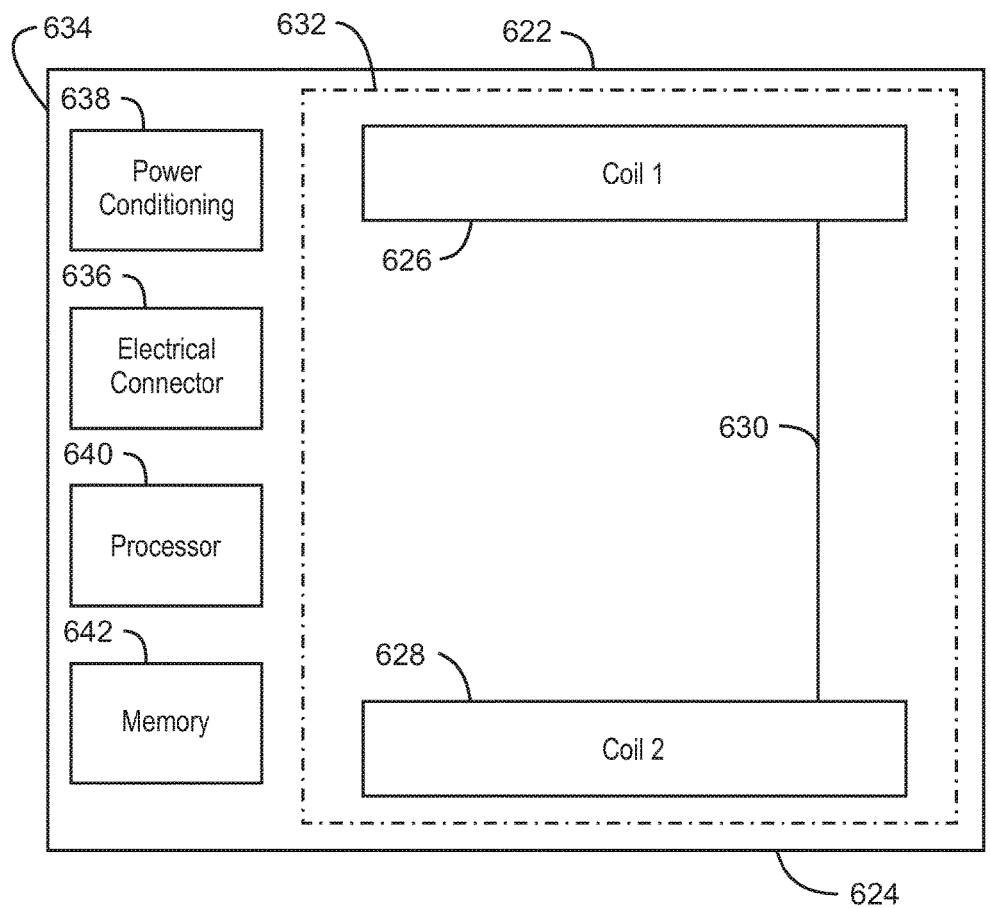
FIG. 6A is a diagram of a wireless power transfer device having two coils in accordance with embodiments of the present techniques.

FIG. 6A is a wireless power transfer device 620 having a wireless charging or power delivery surface 622 for an electromagnetic field to wirelessly deliver power, and a bottom surface 624 for a reduction of the electromagnetic field so to reduce exposure or absorption in human tissue below the wireless power transfer device 620. The top surface 622 may represent a top surface of a table or desk, or may be a top surface of a PTU to place underneath a table or desk so that a top surface of the table or desk may be a wireless charging or power delivery surface. The top surface of the PTU may be a power delivery surface.

The device 620 includes two coils 626 and 628 of wire (each having windings) in accordance with embodiments of the present techniques. The two coils 626 and 628 and their configuration may be similar to that described with respect to FIG. 6. In other words, the top coil 626 may be similar to the top coil 604 of FIG. 6, the bottom shielding coil 628 may be similar to the bottom shielding coil 602 of FIG. 6, and the planar relationship between the two coils may be similar as that in FIG. 6. The coils 626 and 628 may be coupled via a wired or shunt connector 630 that electrically couples the two coils 626 and 628.

The top coil 626 may be labeled as a charging coil or power delivery coil, and which generates and emits an electromagnetic field. In the illustrated embodiment, the bottom coil 628 generates an electromagnetic field that is generally opposite in phase with the field generated by the top coil 626. Consequently, the combined field exhibits faster decay over distance on the bottom side compare to the top side. Such beneficially provides a difference in magnetic field strength ΔH between the charging surface and bottom of the PTU assembly to reduce exposure below while maintaining the field above the PTU for power delivery to a power receiving device. Further, additional coils may be employed. Moreover, other shielding coils may be positioned to attenuate the electromagnetic field from the charging coil 628, such as to the side of the charging coil 628.

The wireless power transfer device 600 may include an internal chassis 632 supporting the coils 626 and 628. The device 600 also has a housing 634 which may act as a chassis for the two coils 626 and 628 and associated circuitry. The wireless power transfer device 600 has an electrical connector 636 to receive input power from an external power source such as a mains line. The electrical connector 636 may be an electrical adapter, a universal serial bus (USB) port, and so on. A power conditioner 638 (e.g., oscillator and other components) may condition the received input power prior to feed of the power (electricity or current) to the coils 626 and 628. Lastly, the wireless power transfer device 600 may include a processor 640 and memory 642. The memory 642 may store code (e.g., instructions, logic, etc.) executed by the processor to direct the device 600 to implement control and communication actions, and the like. The processor may be a microprocessor, a central processing unit (CPU), and the like. The memory 642 may include nonvolatile memory and volatile memory.

Figure 7:
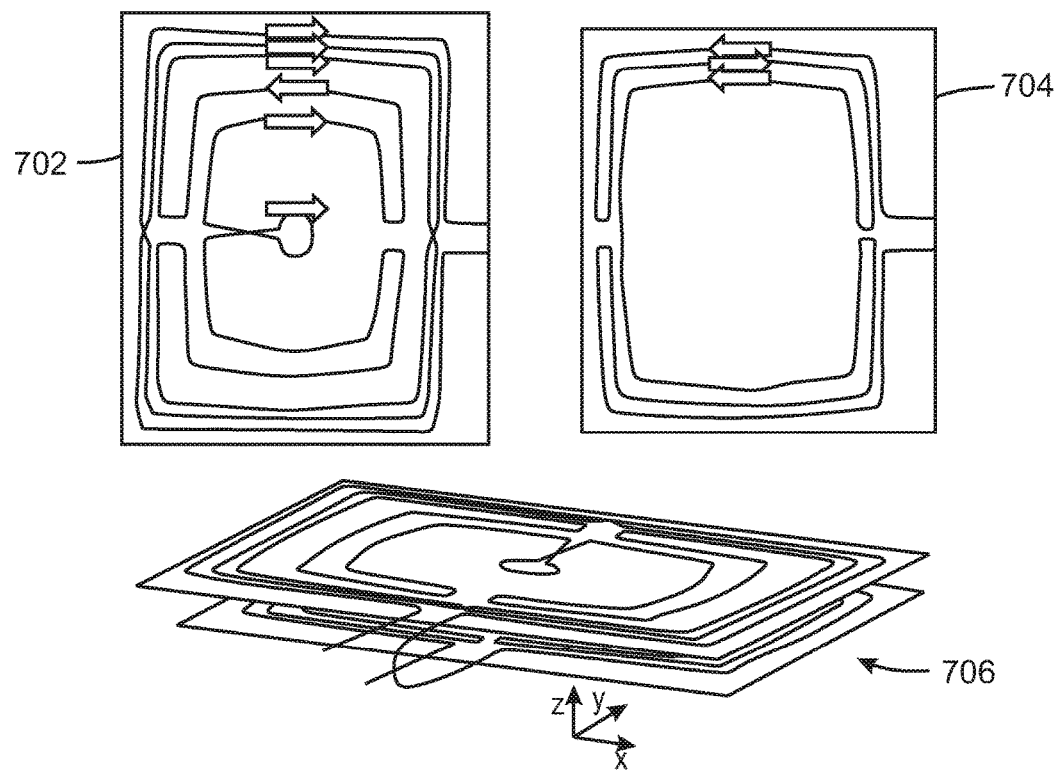
FIG. 7 is a diagram of two coils of a wireless power transfer device in accordance with embodiments of the present techniques.

As discussed, some embodiments employ a first coil for wireless power delivery and a second coil with a reverse-direction turns (opposite winding sense\opposite sign of current) as a shielding coil to aid in simultaneously meeting the two design criteria of uniform field on top of a PTU and reduced field on bottom or sides of the PTU. FIG. 7 is a diagram of examples of such two coils 702 and 704 of a wireless power transfer device. The perspective view 706 depicts coil arrangement in which the coil 702 on top and the coil 704 below in a planar or parallel relationship, and with a vertical or z-separation between the coils 702 and 704. The particular example of FIG. 7 is a 6-turn coil for the first or top charging coil 702 and a 3-turn coil for the second or bottom shielding coil 704. In the illustrated example, the top coil 702 has 5 clockwise (CW) turns with 1 counter clockwise (CCW) turn, which generates an electromagnetic field dominated by CW current. The bottom coil 704 layer has 2 CCW turns and 1 CW turn, which generates a weaker electromagnetic field dominated by CCW current. An example of this double-layer coil structure with embedded reverse turns gave a 50% SAR reduction on the bottom of the PTU assembly while presenting the same uniform field on top of the charging surface as compare to a PTU assembly having only the top coil.

Figure 8:
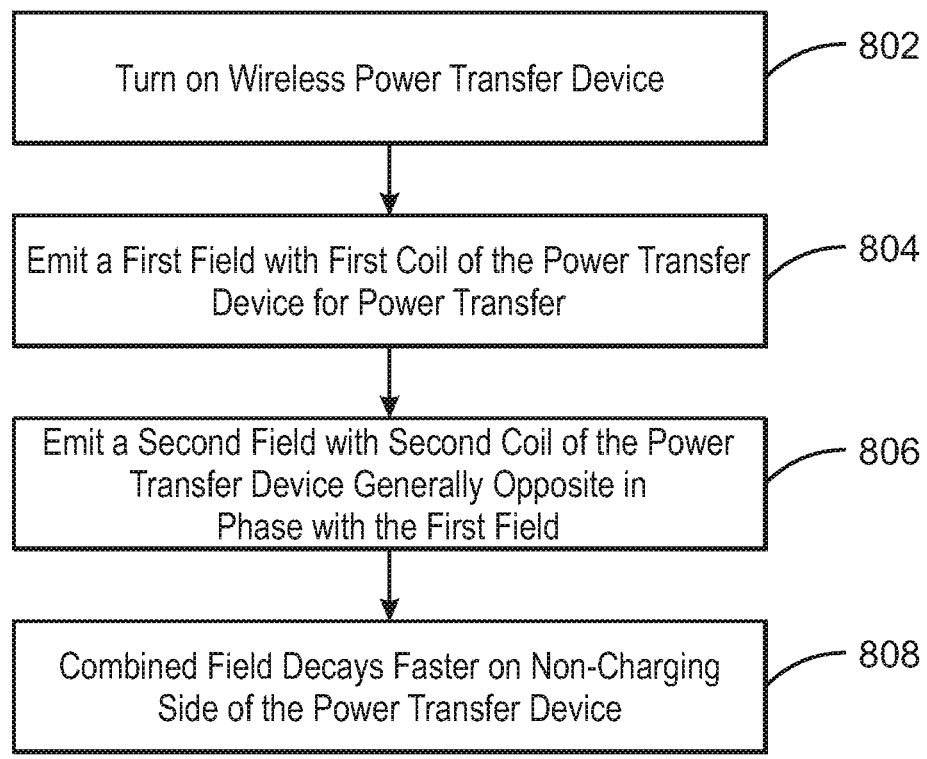
FIG. 8 is a block flow diagram of a method of wireless power transfer via a power transfer device having two coils in accordance with embodiments of the present techniques.

In general, to simultaneously achieve two design goals of uniform field on top and reduced field on bottom, while keeping the same current sense on each coil layer, may be challenging. Therefore, a mixed current direction may be configured and employed for dual or multi-layer configurations. Moreover, the planar coil layers may facilitate manufacturing techniques, such as with a printed circuit board (PCB), while the two or more coil layers can be connected in series or in shunt or otherwise coupled to provide the combined uniform or substantially uniform field on the top and reduced field on bottom. The reversed turn on each planar coil may be used in conjunction with a physical distance (e.g., z-direction) to realize beneficial implementations. This is in contrast to conventional implementations relying solely on a thick chassis with internal stand-off which may be bulky and difficult to install (e.g., FIG. 4), or that use a single charging coil and a layer of ferrite (e.g., FIG. 5) which may be prohibitively expensive for mass production. However, certain embodiments herein may incorporate a thicker or deeper depth of chassis, and/or a layer of ferrite or other shielding material, and so forth FIG. 8 is a method 800 of wireless power transfer. The method 800 is via two coils in a power transfer device. The method may be method of operating the power transfer device to wirelessly transmit power to a receiving device. At block 802, the method includes to turn-on the power transfer device. In other words, input power is received at the circuitry and coils of the power transfer device. The input power may be from a power source such as a mains line. At block 804, the method includes emitting a first electromagnetic field via a first coil in the power transfer device. At block 806, the method includes emitting a second electromagnetic field via a second coil in the power transfer device weaker than the first electromagnetic field. The second electromagnetic field may be substantially opposite in phase with respect to the first electromagnetic field.

At block 808, a combined electromagnetic field of the first electromagnetic field and the second electromagnetic field transmits power wirelessly through a first external surface (e.g., power delivery surface, charging surface, top surface, etc.) of the power transfer device to the receiving device. The combined electromagnetic field decays faster over distance through a second external surface (e.g., bottom surface, not a charging surface, etc.) of the power transfer device than through the first external surface. For example, the combined field decays faster on non-charging side of the power transfer device than on the charging side of the power transfer device. As indicated, the first external surface may a top surface of the power transfer device, and a charging or power delivery surface of the power transfer device. The second external surface may be a bottom surface of the power transfer device, and not a charging or power delivery surface.

Moreover, in general, the first coil may be a charging coil and the second coil a shielding coil. Further, the combined electromagnetic field may be substantially uniform with the first electronic magnetic field through the first external surface, and wherein the first electromagnetic field is attenuated through the second external surface. As for the coils, the first coil may be disposed in an upper portion of the power transfer device, and the second coil disposed in a lower portion of the power transfer device. The first coil and the second coil may planar horizontally and disposed separate in a vertical direction. Indeed, the first electromagnetic field may be symmetric with respect to a first elevation plane on which the first coil resides, and the second electromagnetic field symmetric with respect to a second elevation plane on which the second coil resides. Lastly, the first coil may have more winding turns than the second coil, and wherein both the first coil and second coil may have a mixed current direction.

In summary, embodiments are directed to wireless power technologies including both inductive and resonant charging. A power transfer device may include a surface to wirelessly transfer power to operate a receiving device or for charge of a battery of the receiving device. Again, certain embodiments employ magnetic inductance or magnetic resonance.

An embodiment includes a wireless power transfer device having a first coil (e.g., a charging coil) of wire with a first winding to receive electrical current and emit a first electromagnetic field. The power transfer device has a second coil (e.g., a shielding coil) of wire with a second winding to receive electrical current and emit a second electromagnetic field, the second electromagnetic field weaker than the first electromagnetic field. The combined electromagnetic field of the first electromagnetic field and the second electromagnetic field to (1) transmit power wirelessly through a first external surface (e.g., a top surface, charging surface, power delivery surface, etc.) of the wireless power transfer device to a receiving device; and (2) decay faster over distance through a second external surface (e.g., a bottom surface, surface near where human tissue is expected, not a power delivery surface, etc.) of the wireless power transfer device than through the first external surface. The second electromagnetic field may be opposite in phase with respect to the first electromagnetic field. Beneficially, the combined electromagnetic field may be substantially uniform with the first electromagnetic field through the first external surface, and wherein the first electromagnetic field is attenuated through the second external surface.

The first coil may be disposed in an upper portion of the wireless power transfer device, and the second coil disposed in a lower portion of the wireless power transfer device. The wireless power transfer device may have a connector electrically coupling the first coil to the second coil. Further, the first coil and second coil may be planar horizontally and disposed separate in a vertical direction. Also, the first electromagnetic field may be symmetric with respect to a first elevation plane on which the first coil resides, and the second electromagnetic field symmetric with respect to a second elevation plane on which the second coil resides. In some examples, the first coil winding has more winding turns than the second coil winding.

Moreover, the first coil and second coil may each include a mixed current direction. The first coil winding may have more winding turns in a first direction than winding turns in a second direction, and emission of the first electromagnetic field to be dominated by electrical current flowing in the first direction through the first coil, wherein the second coil winding has more winding turns in the second direction than winding turns in the first direction, and emission of the second electromagnetic field to be dominated by electrical current flowing in the second direction through the second coil. The first coil winding may have at least one winding turn in the second direction. The second coil winding may have at least one winding turn in the first direction. In one example, the first direction is clockwise (CW) and the second direction is counterclockwise (CCW). In another example, the first direction is CCW and the second direction is CW. In a particular example, the first coil winding has at least five winding turns in the first direction, and wherein the second coil winding has least two winding turns in the second direction. In general, electrical current to flow in the first direction through winding turns having the first direction and electrical current to flow in the second direction through winding turns having the second direction.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

Examples are given. Example 1 is a wireless power transfer device. The device includes a first coil of wire comprising a first winding to receive electrical current and emit a first electromagnetic field; and a second coil of wire comprising a second winding to receive electrical current and emit a second electromagnetic field, the second electromagnetic field weaker than the first electromagnetic field. A combined electromagnetic field of the first electromagnetic field and the second electromagnetic field to transmit power wirelessly through a first external surface of the wireless power transfer device to a receiving device; and decay faster over distance through a second external surface of the wireless power transfer device than through the first external surface.

Example 2 includes the device of example 1, including or excluding optional features. In this example, the first coil is a charging coil and the second coil is a shielding coil.

Example 3 includes the device of any one of examples 1 to 2, including or excluding optional features. In this example, the second electromagnetic field is opposite in phase with respect to the first electromagnetic field.

Example 4 includes the device of any one of examples 1 to 3, including or excluding optional features. In this example, the combined electromagnetic field is substantially uniform with the first electromagnetic field through the first external surface, and wherein the first electromagnetic field is attenuated through the second external surface.

Example 5 includes the device of any one of examples 1 to 4, including or excluding optional features. In this example, the first external surface is a top surface of the wireless power transfer device, and the second external surface is a bottom surface of the wireless power transfer device.

Example 6 includes the device of any one of examples 1 to 5, including or excluding optional features. In this example, the first coil is disposed in an upper portion of the wireless power transfer device, and the second coil is disposed in a lower portion of the wireless power transfer device.

Example 7 includes the device of any one of examples 1 to 6, including or excluding optional features. In this example, the first coil and second coil are planar horizontally and disposed separate in a vertical direction.

Example 8 includes the device of any one of examples 1 to 7, including or excluding optional features. In this example, the first electromagnetic field is symmetric with respect to a first elevation plane on which the first coil resides, and the second electromagnetic field is symmetric with respect to a second elevation plane on which the second coil resides.

Example 9 includes the device of any one of examples 1 to 8, including or excluding optional features. In this example, the first coil having the first winding comprises more winding turns than the second coil having the second winding.

Example 10 includes the device of any one of examples 1 to 9, including or excluding optional features. In this example, the first coil having the first winding comprises more winding turns in a first direction than winding turns in a second direction, and emission of the first electromagnetic field to be dominated by electrical current flowing in the first direction through the first coil, wherein the second coil having the second winding comprises more winding turns in the second direction than winding turns in the first direction, and emission of the second electromagnetic field to be dominated by electrical current flowing in the second direction through the second coil, and wherein electrical current to flow in the first direction through winding turns having the first direction and electrical current to flow in the second direction through winding turns having the second direction. Optionally, the first direction is clockwise (CW) and the second direction is counterclockwise (CCW), or wherein the first direction is CCW and the second direction is CW. Optionally, the first coil having the first winding comprises at least five winding turns in the first direction, and wherein the second coil having the second winding comprises at least two winding turns in the second direction. Optionally, the first coil having the first winding comprises at least one winding turn in the second direction. Optionally, the second coil having the second winding comprises at least one winding turn in the first direction.

Example 11 includes the device of any one of examples 1 to 10, including or excluding optional features. In this example, the first coil comprises a mixed current direction.

Example 12 includes the device of any one of examples 1 to 11, including or excluding optional features. In this example, the second coil comprises a mixed current direction.

Example 13 includes the device of any one of examples 1 to 12, including or excluding optional features. In this example, the device includes a connector coupling electrically the first coil to the second coil.

Example 14 is a method of wireless power transfer. The method includes emitting a first electromagnetic field via a first coil in a power transfer device; and emitting a second electromagnetic field via a second coil in the power transfer device weaker than the first electromagnetic field, wherein a combined electromagnetic field of the first electromagnetic field and the second electromagnetic field transmits power wirelessly through a first external surface of the power transfer device to a receiving device and decays faster over distance through a second external surface of the power transfer device than through the first external surface.

Example 15 includes the method of example 14, including or excluding optional features. In this example, the first coil is a charging coil and the second coil is a shielding coil, wherein the second electromagnetic field is opposite in phase with respect to the first electromagnetic field, wherein the combined electromagnetic field is substantially uniform with the first electronic magnetic field through the first external surface, and wherein the first electromagnetic field is attenuated through the second external surface.

Example 16 includes the method of any one of examples 14 to 15, including or excluding optional features. In this example, the first external surface is a top surface of the power transfer device, and the second external surface is a bottom surface of the power transfer device, wherein the first coil is disposed in an upper portion of the power transfer device, and the second coil is disposed in a lower portion of the power transfer device, and wherein the first coil and the second coil are planar horizontally and disposed separate in a vertical direction.

Example 17 includes the method of any one of examples 14 to 16, including or excluding optional features. In this example, the first electromagnetic field is symmetric with respect to a first elevation plane on which the first coil resides, and the second electromagnetic field is symmetric with respect to a second elevation plane on which the second coil resides.

Example 18 includes the method of any one of examples 14 to 17, including or excluding optional features. In this example, the first coil comprises a first winding having more winding turns than the second coil having a second winding, and wherein both the first coil and second coil comprise a mixed current direction.

Example 19 is a method of manufacturing a power transfer device to wirelessly transmit power to a receiving device. The method includes disposing a first coil in a chassis of a housing of the power transfer device, the first coil to receive electrical current and emit a first electromagnetic field; and disposing a second coil in the chassis, the second coil to receive electrical current and emit a second electromagnetic field weaker than the first electromagnetic field, wherein a combined electromagnetic field of the first electromagnetic field and the second electromagnetic field to: transmit power wirelessly through a first external surface of the power transfer device to a receiving device; and decay faster over distance through a second external surface of the power transfer device than through the first external surface.

Example 20 includes the method of example 19, including or excluding optional features. In this example, the first external surface is a top surface of the power transfer device, and the second external surface is a bottom surface of the power transfer device, wherein the first coil is disposed in an upper portion of the chassis, and the second coil is disposed in a lower portion of the chassis, wherein the first coil and second coil are planar horizontally and disposed separate in a vertical direction, and wherein the first coil comprises a first winding having more winding turns than the second coil having a second winding.

Example 21 includes the method of any one of examples 19 to 20, including or excluding optional features. In this example, the method includes electrically coupling the first coil to the second coil, wherein the first coil is a charging coil and the second coil is a shielding coil, wherein the second electromagnetic field is opposite in phase with respect to the first electromagnetic field, wherein the combined electromagnetic field is substantially uniform with the first electronic magnetic field through the first external surface, and wherein the first electromagnetic field is attenuated through the second external surface.

Example 22 is a wireless power transfer device. The device includes a first coil of wire comprising a first winding to receive electrical current and emit a first electromagnetic field; and a second coil of wire comprising a second winding to receive electrical current and emit a second electromagnetic field, the second electromagnetic field weaker than the first electromagnetic field, wherein a combined electromagnetic field of the first electromagnetic field and the second electromagnetic field to transmit power wirelessly through a first external surface of the wireless power transfer device to a receiving device and decay faster over distance through a second external surface of the wireless power transfer device than through the first external surface.

Example 23 includes the device of example 22, including or excluding optional features. In this example, the first coil is a charging coil and the second coil is a shielding coil, wherein the second electromagnetic field is opposite in phase with respect to the first electromagnetic field.

Example 24 includes the device of any one of examples 22 to 23, including or excluding optional features. In this example, the first coil having the first winding comprises more winding turns than the second coil having the second winding, wherein the combined electromagnetic field is substantially uniform with the first electromagnetic field through the first external surface, and wherein the first electromagnetic field is attenuated through the second external surface.

Example 25 includes the device of any one of examples 22 to 24, including or excluding optional features. In this example, the first external surface is a top surface of the wireless power transfer device, and the second external surface is a bottom surface of the wireless power transfer device.

Example 26 includes the device of any one of examples 22 to 25, including or excluding optional features. In this example, the first coil and second coil are planar horizontally and disposed separate in a vertical direction, wherein the first coil is disposed in an upper portion of the wireless power transfer device and the second coil is disposed in a lower portion of the wireless power transfer device, and wherein the first electromagnetic field is symmetric with respect to a first elevation plane on which the first coil resides and the second electromagnetic field is symmetric with respect to a second elevation plane on which the second coil resides.

Example 27 includes the device of any one of examples 22 to 26, including or excluding optional features. In this example, the first coil having the first winding comprises more winding turns in a first direction than winding turns in a second direction, and emission of the first electromagnetic field to be dominated by electrical current flowing in the first direction through the first coil, wherein the second coil having the second winding comprises more winding turns in the second direction than winding turns in the first direction, and emission of the second electromagnetic field to be dominated by electrical current flowing in the second direction through the second coil, and wherein electrical current to flow in the first direction through winding turns having the first direction and electrical current to flow in the second direction through winding turns having the second direction. Optionally, the first direction is clockwise (CW) and the second direction is counterclockwise (CCW), or wherein the first direction is CCW and the second direction is CW; the first coil having the first winding comprises at least one winding turn in the second direction and the second coil having the second winding comprises at least one winding turn in the first direction; and the first coil comprises a mixed current direction, and the second coil comprises a mixed current direction.

Example 28 is a system for wireless power transfer. The system includes means for emitting a first electromagnetic field via a first coil in a power transfer device; and means for emitting a second electromagnetic field via a second coil in the power transfer device weaker than the first electromagnetic field, wherein a combined electromagnetic field of the first electromagnetic field and the second electromagnetic field transmits power wirelessly through a first external surface of the power transfer device to a receiving device and decays faster over distance through a second external surface of the power transfer device than through the first external surface.

Example 29 includes the system of example 28, including or excluding optional features. In this example, the first coil is a charging coil and the second coil is a shielding coil, wherein the second electromagnetic field is opposite in phase with respect to the first electromagnetic field, wherein the combined electromagnetic field is substantially uniform with the first electronic magnetic field through the first external surface, and wherein the first electromagnetic field is attenuated through the second external surface.

Example 30 includes the system of any one of examples 28 to 29, including or excluding optional features. In this example, the first external surface is a top surface of the power transfer device, and the second external surface is a bottom surface of the power transfer device, wherein the first coil is disposed in an upper portion of the power transfer device, and the second coil is disposed in a lower portion of the power transfer device, and wherein the first coil and the second coil are planar horizontally and disposed separate in a vertical direction.

Example 31 includes the system of any one of examples 28 to 30, including or excluding optional features. In this example, the first electromagnetic field is symmetric with respect to a first elevation plane on which the first coil resides, and the second electromagnetic field is symmetric with respect to a second elevation plane on which the second coil resides.

Example 32 includes the system of any one of examples 28 to 31, including or excluding optional features. In this example, the first coil comprises a first winding having more winding turns than the second coil having a second winding, and wherein both the first coil and second coil comprise a mixed current direction.

Example 33 is a wireless charger. The wireless charger includes a first coil of wire to receive electrical current and emit a first electromagnetic field; a second coil of wire to receive electrical current and emit a second electromagnetic field, the second electromagnetic field weaker than the first electromagnetic field; and wherein a combined electromagnetic field of the first electromagnetic field and the second electromagnetic field to: transmit power wirelessly through a first external surface comprising a charging surface of the wireless charger to a receiving device having a battery to be charged; and decay faster over distance through second external surface of the wireless charger than through the charging surface. Optionally, the first coil is a charging coil and the second coil is a shielding coil.

Example 34 includes the wireless charger of any one of examples 33 to 33, including or excluding optional features. In this example, the second electromagnetic field is opposite in phase with respect to the first electromagnetic field.

Example 35 includes the wireless charger of any one of examples 33 to 34, including or excluding optional features. In this example, the combined electromagnetic field is substantially uniform with the first electromagnetic field through the charging surface, and wherein the first electromagnetic field is attenuated through the second external surface.

Example 36 includes the wireless charger of any one of examples 33 to 35, including or excluding optional features. In this example, the charging surface is a top surface of the wireless charger, and the second external surface is a bottom surface of the wireless charger.

Example 37 includes the wireless charger of any one of examples 33 to 36, including or excluding optional features. In this example, the first coil is disposed in an upper portion of the wireless charger, and the second coil is disposed in a lower portion of the wireless charger.

Example 38 includes the wireless charger of any one of examples 33 to 37, including or excluding optional features. In this example, the first coil and second coil are planar horizontally and disposed separate in a vertical direction.

Example 39 includes the wireless charger of any one of examples 33 to 38, including or excluding optional features. In this example, the first electromagnetic field is symmetric with respect to a first elevation plane on which the first coil resides, and the second electromagnetic field is symmetric with respect to a second elevation plane on which the second coil resides.

Example 40 includes the wireless charger of any one of examples 33 to 39, including or excluding optional features. In this example, the first coil comprises more winding turns than the second coil.

Example 41 includes the wireless charger of any one of examples 33 to 40, including or excluding optional features. In this example, the first coil comprises more winding turns in a first direction than winding turns in a second direction, and emission of the first electromagnetic field to be dominated by electrical current flowing in the first direction through the first coil, wherein the second coil comprises more winding turns in the second direction than winding turns in the first direction, and emission of the second electromagnetic field to be dominated by electrical current flowing in the second direction through the second coil, and wherein electrical current to flow in the first direction through winding turns having the first direction and electrical current to flow in the second direction through winding turns having the second direction. Optionally, the first direction is clockwise (CW) and the second direction is counterclockwise (CCW), or wherein the first direction is CCW and the second direction is CW. Optionally, the first coil comprises at least five winding turns in the first direction, and wherein the second coil comprises at least two winding turns in the second direction. Optionally, the first coil comprises at least one winding turn in the second direction. Optionally, the second coil comprises at least one winding turn in the first direction.

Example 42 includes the wireless charger of any one of examples 33 to 41, including or excluding optional features. In this example, the first coil comprises a mixed current direction.

Example 43 includes the wireless charger of any one of examples 33 to 42, including or excluding optional features. In this example, the second coil comprises a mixed current direction.

Example 44 includes the wireless charger of any one of examples 33 to 43, including or excluding optional features. In this example, the wireless charger includes a connector electrically coupling the first coil to the second coil.

Example 45 is a wireless power transfer device. The wireless power transfer device includes a first coil of wire comprising a first winding to receive electrical current and emit a first electromagnetic field; and a second coil of wire comprising a second winding to receive electrical current and emit a second electromagnetic field having a weaker electromagnetic field than the first electromagnetic field. The wireless power transfer device to combine the first electromagnetic field and the second electromagnetic field to form a combined electromagnetic field; and transmit power wirelessly through a first external surface of the wireless power transfer device to a receiving device with the combined electromagnetic field, wherein the combined electromagnetic field comprises a faster decay over distance through a second external surface than through the first external surface.

Example 46 includes the wireless power transfer device of example 45, including or excluding optional features. In this example, the first coil is a charging coil and the second coil is a shielding coil.

Example 47 includes the wireless power transfer device of any of the examples 45 to 46, including or excluding optional features. In this example, the second electromagnetic field is opposite in phase to the first electromagnetic field.

Example 48 includes the wireless power transfer device of any of the examples 45 to 47, including or excluding optional features. In this example, the combined electromagnetic field is substantially uniform with the first electromagnetic field through the first external surface, and wherein the first electromagnetic field is attenuated through the second external surface.

Example 49 includes the wireless power transfer device of any of the examples 45 to 48, including or excluding optional features. In this example, the first external surface is a top surface of the wireless power transfer device, and the second external surface is a bottom surface of the wireless power transfer device.

Example 50 includes the wireless power transfer device of any of the examples 45 to 49, including or excluding optional features. In this example, the first coil is disposed in an upper portion of the wireless power transfer device, and the second coil is disposed in a lower portion of the wireless power transfer device.

Example 51 includes the wireless power transfer device of any of the examples 45 and 50, including or excluding optional features. In this example, the first coil and second coil are planar horizontally and disposed separate in a vertical direction.

Example 52 includes the wireless power transfer device of any of the examples 45 to 51, including or excluding optional features. In this example, the first electromagnetic field is symmetric with respect to a first elevation plane on which the first coil resides, and the second electromagnetic field is symmetric with respect to a second elevation plane on which the second coil resides.

Example 53 includes the wireless power transfer device of any of the examples 45 to 52, including or excluding optional features. In this example, the first coil having the first winding comprises more winding turns than the second coil having the second winding.

Example 54 includes the wireless power transfer device of any of the examples 45 to 53, including or excluding optional features. In this example, the first coil having the first winding comprises more winding turns in a first direction than winding turns in a second direction, and wherein the second coil having the second winding comprises more winding turns in the second direction than winding turns in the first direction. Optionally, emission of the first electromagnetic field to be dominated by electrical current flowing in the first direction through the first coil, wherein emission of the second electromagnetic field to be dominated by electrical current flowing in the second direction through the second coil, and wherein electrical current to flow in the first direction through winding turns having the first direction and electrical current to flow in the second direction through winding turns having the second direction. Optionally, the first direction is clockwise (CW) and the second direction is counterclockwise (CCW), or wherein the first direction is CCW and the second direction is CW. Optionally, the first coil having the first winding comprises at least five winding turns in the first direction, and wherein the second coil having the second winding comprises at least two winding turns in the second direction. Optionally, the first coil having the first winding comprises at least one winding turn in the second direction. Optionally, the second coil having the second winding comprises at least one winding turn in the first direction.

Example 55 includes the wireless power transfer device of any of the examples 45 to 54, including or excluding optional features. In this example, the first coil or second coil, or both, comprise a mixed current direction.

Example 56 includes the wireless power transfer device of any of the examples 45 to 55, including or excluding optional features. In this example, a connector couples electrically the first coil to the second coil.

Example 57 is a method of wireless power transfer. The method includes emitting a first electromagnetic field via a first coil in a power transfer device; emitting a second electromagnetic field via a second coil weaker than the first electromagnetic field; combining the first electromagnetic field and the second electromagnetic field to form a combined electromagnetic field; and transmitting power wirelessly with the combined electromagnetic field through a first external surface of the power transfer device to a receiving device, wherein the combined electromagnetic field decays faster over distance through a second external surface than through the first external surface.

Example 58 includes the method of example 57, including or excluding optional features. In this example, the first coil is a charging coil and the second coil is a shielding coil, wherein the second electromagnetic field is opposite in phase with respect to the first electromagnetic field, wherein the combined electromagnetic field is substantially uniform with the first electronic magnetic field through the first external surface, and wherein the first electromagnetic field is attenuated through the second external surface.

Example 59 includes the method of any of the examples 57 to 58, including or excluding optional features. In this example, the first external surface is a top surface of the power transfer device, and the second external surface is a bottom surface of the power transfer device, wherein the first coil is disposed in an upper portion of the power transfer device, and the second coil is disposed in a lower portion of the power transfer device, and wherein the first coil and the second coil are planar horizontally and disposed separate in a vertical direction.

Example 60 includes the method of any of the examples 57 to 59, including or excluding optional features. In this example, the first electromagnetic field is symmetric with respect to a first elevation plane on which the first coil resides, and the second electromagnetic field is symmetric with respect to a second elevation plane on which the second coil resides.

Example 61 includes the method of any of the examples 57 to 60, including or excluding optional features. In this example, the first coil comprises a first winding having more winding turns than the second coil having a second winding, and wherein both the first coil and second coil comprise a mixed current direction.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A wireless power transfer device comprising:
   a first coil of wire comprising a first winding to receive electrical current and emit a first electromagnetic field; and
   a second coil of wire comprising a second winding to receive electrical current and emit a second electromagnetic field having a weaker electromagnetic field than the first electromagnetic field, the wireless power transfer device to:
      combine the first electromagnetic field and the second electromagnetic field to form a combined electromagnetic field; and
      transmit power wirelessly through a first external surface of the wireless power transfer device to a receiving device with the combined electromagnetic field, wherein the combined electromagnetic field comprises a faster decay over distance through a second external surface than through the first external surface.

2. The wireless power transfer device of claim 1, wherein the first coil is a charging coil and the second coil is a shielding coil.

3. The wireless power transfer device of claim 1, wherein the second electromagnetic field is opposite in phase to the first electromagnetic field.

4. The wireless power transfer device of claim 1, wherein the combined electromagnetic field is substantially uniform with the first electromagnetic field through the first external surface, and wherein the first electromagnetic field is attenuated through the second external surface.

5. The wireless power transfer device of claim 1, wherein the first external surface is a top surface of the wireless power transfer device, and the second external surface is a bottom surface of the wireless power transfer device.

6. The wireless power transfer device of claim 1, wherein the first coil is disposed in an upper portion of the wireless power transfer device, and the second coil is disposed in a lower portion of the wireless power transfer device.

7. The wireless power transfer device of claim 1, wherein the first coil and second coil are planar horizontally and disposed separate in a vertical direction.

8. The wireless power transfer device of claim 1, wherein the first electromagnetic field is symmetric with respect to a first elevation plane on which the first coil resides, and the second electromagnetic field is symmetric with respect to a second elevation plane on which the second coil resides.

9. The wireless power transfer device of claim 1, wherein the first coil having the first winding comprises more winding turns than the second coil having the second winding.

10. The wireless power transfer device of claim 1, wherein the first coil having the first winding comprises more winding turns in a first direction than winding turns in a second direction, and wherein the second coil having the second winding comprises more winding turns in the second direction than winding turns in the first direction.

11. The wireless power transfer device of claim 10, wherein emission of the first electromagnetic field to be dominated by electrical current flowing in the first direction through the first coil, wherein emission of the second electromagnetic field to be dominated by electrical current flowing in the second direction through the second coil, and wherein electrical current to flow in the first direction through winding turns having the first direction and electrical current to flow in the second direction through winding turns having the second direction.

12. The wireless power transfer device of claim 10, wherein the first direction is clockwise (CW) and the second direction is counterclockwise (CCW), or wherein the first direction is CCW and the second direction is CW.

13. The wireless power transfer device of claim 10, wherein the first coil having the first winding comprises at least five winding turns in the first direction, and wherein the second coil having the second winding comprises at least two winding turns in the second direction.

14. The wireless power transfer device of claim 13, wherein the first coil having the first winding comprises at least one winding turn in the second direction.

15. The wireless power transfer device of claim 13, wherein the second coil having the second winding comprises at least one winding turn in the first direction.

16. The wireless power transfer device of claim 1, wherein the first coil or second coil, or both, comprise a mixed current direction.

17. The wireless power transfer device of claim 1, comprising a connector coupling electrically the first coil to the second coil.

18. A method of wireless power transfer, comprising:
   emitting a first electromagnetic field via a first coil in a power transfer device; and
   emitting a second electromagnetic field via a second coil weaker than the first electromagnetic field;

combining the first electromagnetic field and the second electromagnetic field to form a combined electromagnetic field; and transmitting power wirelessly with the combined electromagnetic field through a first external surface of the power transfer device to a receiving device, wherein the combined electromagnetic field decays faster over distance through a second external surface than through the first external surface.

19. The method of claim 18, wherein the first coil is a charging coil and the second coil is a shielding coil, wherein the second electromagnetic field is opposite in phase with respect to the first electromagnetic field, wherein the combined electromagnetic field is substantially uniform with the first electronic magnetic field through the first external surface, and wherein the first electromagnetic field is attenuated through the second external surface.

20. The method of claim 18, wherein the first external surface is a top surface of the power transfer device, and the second external surface is a bottom surface of the power transfer device, wherein the first coil is disposed in an upper portion of the power transfer device, and the second coil is disposed in a lower portion of the power transfer device, and wherein the first coil and the second coil are planar horizontally and disposed separate in a vertical direction.

21. The method of claim 18, wherein the first electromagnetic field is symmetric with respect to a first elevation plane on which the first coil resides, and the second electromagnetic field is symmetric with respect to a second elevation plane on which the second coil resides.

22. The method of claim 18, wherein the first coil comprises a first winding having more winding turns than the second coil having a second winding, and wherein both the first coil and second coil comprise a mixed current direction.

23. A method of manufacturing a power transfer device to wirelessly transmit power to a receiving device, comprising:

disposing a first coil in a chassis of a housing of the power transfer device, the first coil to receive electrical current and emit a first electromagnetic field; and disposing a second coil in the chassis, the second coil to receive electrical current and emit a second electromagnetic field weaker than the first electromagnetic field, wherein a combined electromagnetic field of the first electromagnetic field and the second electromagnetic field to:

transmit power wirelessly through a first external surface of the power transfer device to a receiving device; and decay faster over distance through a second external surface of the power transfer device than through the first external surface.

24. The method of claim 23, wherein the first external surface is a top surface of the power transfer device, and the second external surface is a bottom surface of the power transfer device, wherein the first coil is disposed in an upper portion of the chassis, and the second coil is disposed in a lower portion of the chassis, wherein the first coil and second coil are planar horizontally and disposed separate in a vertical direction, and wherein the first coil comprises a first winding having more winding turns than the second coil having a second winding.

25. The method of claim 23, comprising electrically coupling the first coil to the second coil, wherein the first coil is a charging coil and the second coil is a shielding coil, wherein the second electromagnetic field is opposite in phase with respect to the first electromagnetic field, wherein the combined electromagnetic field is substantially uniform with the first electronic magnetic field through the first external surface, and wherein the first electromagnetic field is attenuated through the second external surface.

* * * * *